(12) United States Patent
Sata

(10) Patent No.: US 8,996,260 B2
(45) Date of Patent: Mar. 31, 2015

(54) AUTOMOBILE PADDLE SHIFTERS WITH FIRST AND SECOND POSITIONS

(71) Applicant: Toyota Motor Engineering & Manufacturing North America, Inc., Erlanger, KY (US)

(72) Inventor: Andrew Sata, Gardena, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 271 days.

(21) Appl. No.: 13/660,871

(22) Filed: Oct. 25, 2012

(65) Prior Publication Data

US 2014/0116178 A1    May 1, 2014

(51) Int. Cl.
*B60W 10/10*    (2012.01)
*B60K 20/06*    (2006.01)
*F16H 59/02*    (2006.01)
*F16H 61/02*    (2006.01)

(52) U.S. Cl.
CPC ............ *F16H 59/02* (2013.01); *F16H 61/0213* (2013.01); *F16H 2059/0247* (2013.01); *F16H 2059/0252* (2013.01); *Y10T 74/20146* (2015.01)
USPC .......................................... 701/51; 74/473.31

(58) Field of Classification Search
USPC .......................................... 701/51; 74/473.31
See application file for complete search history.

(56) References Cited

U.S. PATENT DOCUMENTS

| | | | |
|---|---|---|---|
| RE31,451 E | 11/1983 | Osborn | |
| 4,574,661 A | 3/1986 | Opperud et al. | |
| 5,029,680 A | 7/1991 | Kobayashi et al. | |
| 5,050,079 A | 9/1991 | Steeby | |
| 5,335,743 A | 8/1994 | Gillbrand et al. | |
| 5,425,686 A | 6/1995 | Grange | |
| 5,456,333 A | 10/1995 | Brandt et al. | |
| 6,076,414 A | 6/2000 | Tabata et al. | |
| 6,109,126 A | 8/2000 | Cochran et al. | |
| 6,474,186 B1 | 11/2002 | Vollmar | |

(Continued)

FOREIGN PATENT DOCUMENTS

DE    43 11 852    9/1994
DE    102 48 398    6/2004

(Continued)

OTHER PUBLICATIONS

Electro-Pneumatic Systems for Formula SAE Applications; USC Racing; http:uscracing.wikispaces.com/Electro-Pneumatic+Shifting; 6 pages; printed on Mar. 8, 2013.

(Continued)

*Primary Examiner* — Edwin A Young
(74) *Attorney, Agent, or Firm* — Snell & Wilmer

(57) ABSTRACT

A system for controlling gear changes in a vehicle. The system includes a steering wheel and a detent mechanism having an idle location, a first location, and a second location, the detent mechanism is coupled to the steering wheel. The system also includes a paddle shifter coupled to the steering wheel and the detent mechanism, the paddle shifter having an idle position with no associated function when the paddle shifter is in the idle location, a first operating position with an associated first function when the paddle shifter is in the first location, and a second operating position with an associated second function when the paddle shifter is in the second location. The associated first function is different from the associated second function.

17 Claims, 6 Drawing Sheets

(56) References Cited

U.S. PATENT DOCUMENTS

| | | |
|---|---|---|
| 6,525,283 B2 | 2/2003 | Leng |
| 6,555,928 B1 | 4/2003 | Mizuno et al. |
| 6,773,369 B2 | 8/2004 | Altenkirch et al. |
| 6,939,266 B2 | 9/2005 | Koerner et al. |
| 6,962,552 B2 | 11/2005 | Sakamoto et al. |
| 6,978,691 B2 | 12/2005 | Katakura |
| 7,182,710 B2 | 2/2007 | Surampudi |
| 7,278,510 B1 | 10/2007 | Richards |
| 7,367,420 B1 | 5/2008 | Sherrod et al. |
| 7,470,212 B2 | 12/2008 | Inagaki et al. |
| 7,470,213 B2 | 12/2008 | Matsudaira et al. |
| 7,555,967 B2 | 7/2009 | Terayama et al. |
| 7,563,189 B2 | 7/2009 | Inuta |
| 7,597,021 B2 | 10/2009 | Nishio et al. |
| 7,603,924 B2 | 10/2009 | Mandou et al. |
| 7,678,005 B2 | 3/2010 | Tuckfield |
| 7,704,187 B2 | 4/2010 | Saito et al. |
| 7,717,823 B2 | 5/2010 | Balamucki et al. |
| 7,774,118 B2 | 8/2010 | Hata et al. |
| 7,819,776 B2 | 10/2010 | Toi et al. |
| 7,841,254 B2 | 11/2010 | Ho |
| 7,845,457 B2 | 12/2010 | Baluch et al. |
| 8,021,268 B2 | 9/2011 | Sawada |
| 8,055,414 B2 | 11/2011 | Tawara |
| 8,063,324 B2 | 11/2011 | Sakai et al. |
| 8,133,152 B2 | 3/2012 | Iwao et al. |
| 8,135,521 B2 | 3/2012 | Sugiura et al. |
| 8,186,241 B2 | 5/2012 | Sickart |
| 2007/0293367 A1 | 12/2007 | Trevino et al. |
| 2008/0021609 A1 | 1/2008 | Derby et al. |
| 2008/0182718 A1 | 7/2008 | Ido et al. |
| 2008/0221760 A1 | 9/2008 | Wakamatsu et al. |
| 2009/0200761 A1 | 8/2009 | Stevens |
| 2009/0218160 A1 * | 9/2009 | Baluch et al. ................ 180/336 |
| 2009/0270223 A1 | 10/2009 | Cook |
| 2010/0175499 A1 | 7/2010 | Thomas et al. |
| 2010/0305823 A1 | 12/2010 | Kitaori et al. |
| 2011/0005492 A1 | 1/2011 | Takeuchi et al. |
| 2011/0011196 A1 | 1/2011 | Cable |
| 2011/0061488 A1 * | 3/2011 | Walters et al. ................. 74/552 |
| 2011/0130928 A1 | 6/2011 | Matsunaga et al. |
| 2011/0132120 A1 | 6/2011 | Skogward |
| 2011/0160969 A1 | 6/2011 | Oguri et al. |
| 2011/0224878 A1 | 9/2011 | Nakamura et al. |
| 2011/0295475 A1 | 12/2011 | Shimizu et al. |
| 2012/0059556 A1 | 3/2012 | Tanaka et al. |
| 2012/0144947 A1 | 6/2012 | Herbert et al. |
| 2012/0204668 A1 | 8/2012 | Zito et al. |

FOREIGN PATENT DOCUMENTS

| | | |
|---|---|---|
| DE | 10 2004 028014 | 12/2005 |
| GB | 2435678 | 9/2007 |
| GB | 2473294 | 3/2011 |
| JP | 2002254953 | 9/2002 |
| JP | 2003118417 | 4/2003 |
| JP | 2005104423 | 4/2005 |
| JP | 2006022913 | 1/2006 |
| JP | 2007069634 | 3/2007 |
| JP | 2008115975 | 5/2008 |
| JP | 2009192047 | 8/2009 |
| JP | 2010-025277 | 2/2010 |
| JP | 2010047138 | 3/2010 |
| JP | 2011063260 | 3/2011 |

OTHER PUBLICATIONS

Electric Gearshift Actuator; Magneti Marelli S.p.A.; 2 pages; Nov. 2009.

"Can Capable Shift Selectors"; www.arrens.com/products/bywireshift/cancapable.cfm; 1 page; May 13, 2012.

"MasterShift, Paddleshiftng the Future"; mastershif.com/p_street_manual.htm; 2 pages; copyright 2004.

"Shift, Integrated Electronic Safe Shifting System"; www.altronicsinc.com/pages/shift/html; 4 pages; copyright 2011.

"Shrifter Paddle Shifter"; twistmachine.com/shopping; 2 pages; copyright 2012.

* cited by examiner

AUTOMOBILE PADDLE SHIFTERS WITH FIRST AND SECOND POSITIONS

FIELD

The present disclosure relates to paddle shifters, and more particularly, to a paddle shifter with a first position having a first function and a second position having a second function that is different from the first function.

BACKGROUND

Paddle shifters are generally mounted behind or to a steering wheel (or a steering column) of a vehicle to allow the driver to make a manual single sequential gear shift up or down of the vehicle's transmission. Locating the paddle shifters near the steering wheel or the steering column makes it easier for the driver to make manual gear changes without having to take his or her hands off the steering wheel. This increases the driver's control of the vehicle while still allowing the driver to have an enjoyable driving experience.

A paddle shift equipped steering wheel generally has two paddle shifters—one on the right side of the steering wheel and one on the left side of the steering wheel. Each paddle shifter is actuated by either pushing a lever away from or pulling a lever towards the driver. Each paddle shifter is assigned to only one paddle actuation function. That is, depending on the vehicle make and model, one paddle shifter controls a single upshift in gear and one paddle shifter controls a single downshift in gear. In certain instances or situations, the driver may apply the paddle shifter in an inefficient manner and/or need to step multiple gears using a like number of multiple distinct actions to effect a desired gear change.

SUMMARY

The present disclosure relates to paddle shifters, and more particularly, to a paddle shifter with a first position having a first function and a second position having a second function that is different from the first function. In various embodiments, the system controls gear changes in a vehicle. The system includes a steering wheel and a detent mechanism having an idle location, a first location, and a second location, the detent mechanism is coupled to the steering wheel. The system also includes a paddle shifter coupled to the steering wheel and the detent mechanism, the paddle shifter having an idle position with no associated function when the paddle shifter is in the idle location, a first operating position with an associated first function when the paddle shifter is in the first location, and a second operating position with an associated second function when the paddle shifter is in the second location. The associated first function is different from the associated second function. In general, the first operating position is located along a path between the idle position and the second position.

BRIEF DESCRIPTION OF THE DRAWINGS

The features and advantages of the embodiments of the present disclosure will become more apparent from the detailed description set forth below when taken in conjunction with the drawings. Naturally, the drawings and their associated descriptions illustrate example arrangements within the scope of the claims and do not limit the scope of the claims. Reference numbers are reused throughout the drawings to indicate correspondence between referenced elements.

DETAILED DESCRIPTION

Figure 1:
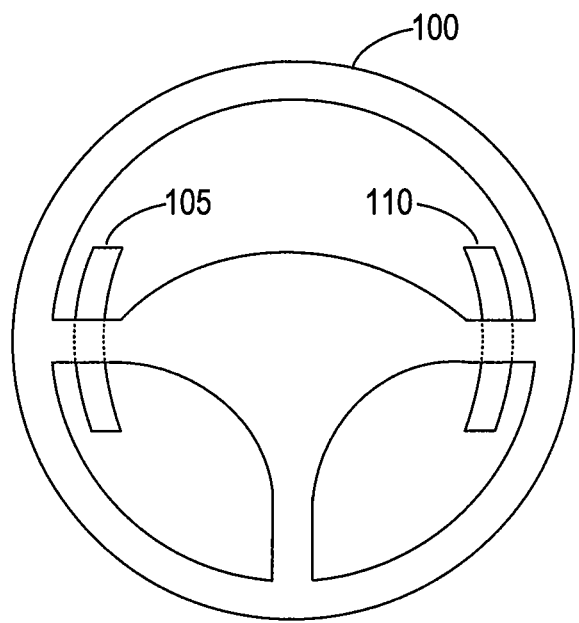
FIG. 1 depicts a partial front view of an automobile steering wheel with paddle shifters according to various embodiments.

In the following detailed description, numerous specific details are set forth to provide an understanding of the present disclosure. It will be apparent, however, to one of ordinarily skilled in the art that elements of the present disclosure may be practiced without some of these specific details. In other instances, well-known structures and techniques have not been shown in detail to avoid unnecessarily obscuring the present disclosure.

A semi-automatic transmission (also known as automated transmission, self-changing transmission, clutch-less manual transmission, automated manual transmission, flappy-paddle gearbox, or paddle-shift gearbox) is an automobile transmission that does not change gears automatically, but rather facilitates manual gear changes by dispensing with the need to press a clutch pedal at the same time as changing gears. It may use electronic sensors, pneumatics, processors and actuators to execute gear shifts on the command of the driver and/or by a computer. This removes the need for a clutch pedal which the driver otherwise needs to depress before making a gear change, since the clutch itself is actuated by electronic equipment which can substantially synchronize the timing and torque required to make quick, smooth gear shifts.

The ability to shift gears manually, often via paddle shifters, can also be found on certain automatic transmissions (manumatics such as Tiptronic) and continuous variable transmissions (CVTs) (such as Lineartronic). Various aspects of the present disclosure may be applicable to these transmissions.

A sensor, such as a Hall Effect sensor, may sense the direction of a requested shift, and this input, together with a sensor in the gear box which senses the current speed and the gear selected, feeds into a central processing unit. This central processing unit then determines the optimal timing and torque required for a smooth clutch engagement, based on input from these two sensors as well as other factors, such as engine rotation, electronic stability control, ECU, air conditioner and dashboard instruments.

At times, it may be beneficial to add additional functionality to a paddle shifter, such as paddle shifters 105 and 110. According to various exemplary embodiments and with reference to FIG. 1, a partial front view of an automobile steering wheel 100 with paddle shifters 105 and 110 is depicted. As shown, a left paddle shifter 105 is attached to or coupled to the steering wheel 100 and/or steering column 200 and is used to downshift the vehicle's transmission by at least one (1) gear per each pull of the left paddle shifter 105. A right paddle shifter 110 is attached to or coupled to the steering wheel 100 and/or steering column 200 and is used to upshift the vehicle's transmission by at least one (1) gear per each pull of the right paddle shifter 110. Alternatively, the left paddle shifter 105 can be used to upshift the vehicle's transmission by at least one (1) gear per each pull of the left paddle shifter 105 and the right paddle shifter 110 can be used to downshift the vehicle's transmission by at least one (1) gear per each pull of the right paddle shifter 110.

According to various embodiments, either the right paddle shifter 110 or the left paddle shifter 105 may be used to upshift or downshift the vehicle's transmission per each pull or push of each paddle shifter. For instance, a pull on either paddle shifter 105 or 110 may actuate or result in a downshift, while a push on either paddle shifter 105, 110 may actuate or result in an upshift. Conversely, according to various embodiments, a push on either paddle shifter 105 or 110 may actuate or result in a downshift, while a pull on either paddle shifter 105 or 110 may actuate or result in an upshift.

Figure 2:
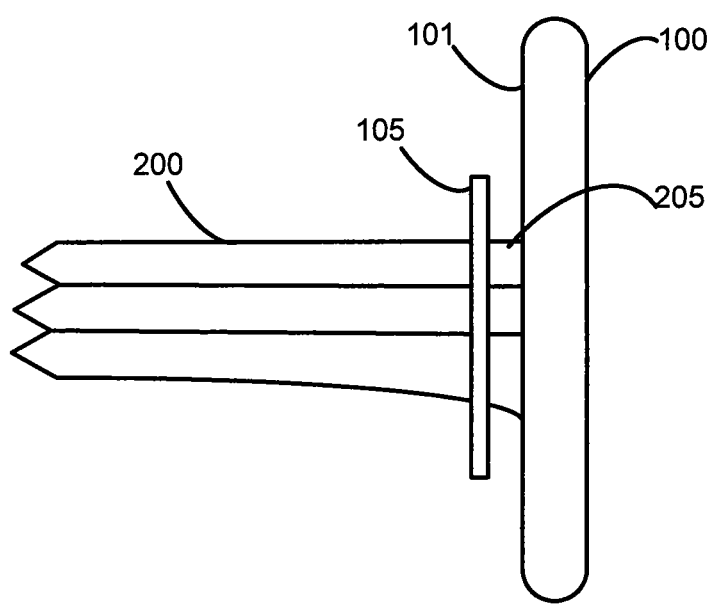
FIG. 2 depicts a left side view of the automobile steering wheel of FIG. 1 showing the left paddle shifter connected to a rear portion of the automobile steering wheel and a steering column according to various embodiments.

FIG. 2 depicts a left side view of the automobile steering wheel 100 of FIG. 1 showing the left paddle shifter 105 connected to a rear portion 101 of the automobile steering wheel 100 and/or a steering column 200 according to various embodiments. The right paddle shifter 110 is also connected to the rear portion 101 of the automobile steering wheel 110. Referring to FIGS. 1 and 2, since the left and right paddle shifters 105 and 110 are connected to the automobile steering wheel 100, the left and right paddle shifters 105 and 110 rotate with the steering wheel 100 when the steering wheel 100 is rotated in the clockwise and counterclockwise directions. According to various embodiments, the left and right paddle shifters 105 and 110 may be coupled to the steering column 200 and remain substantially in a fixed position relative to turning of the steering wheel 100.

Figure 3:
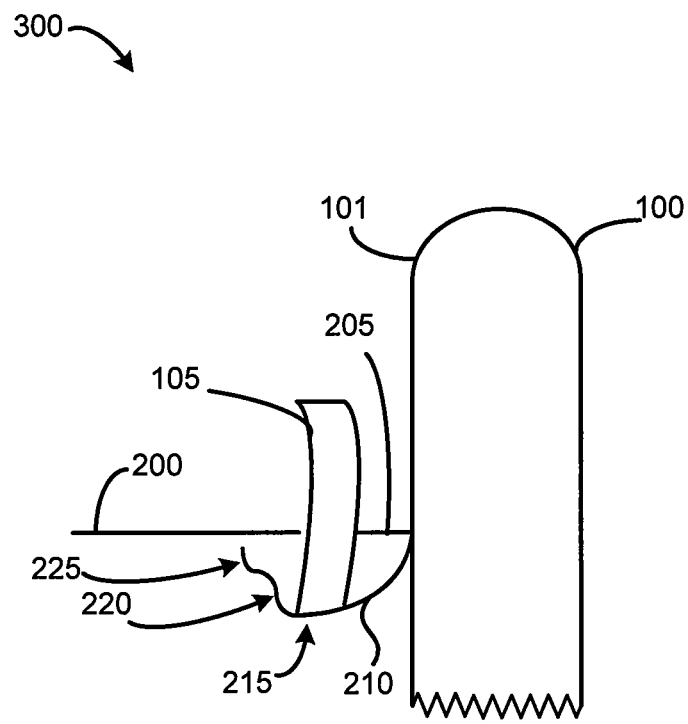
FIG. 3 depicts an exploded left side view of a portion of the automobile steering wheel showing the left paddle shifter and a detent mechanism connected to the rear portion of the automobile steering wheel according to various embodiments.

FIG. 3 depicts an exploded left side view of a portion of the automobile steering wheel 100 showing the left paddle shifter 105 and a detent mechanism 210 connected to the rear portion 101 of the automobile steering wheel 100 and/or steering column 200 according to various embodiments. For illustrative purposes, the paddle shifter 105 will be referred to as the left paddle shifter; however, one skilled in the art will know that the term "left" can be replaced with or used in conjunction with the term "right" depending on the structure, features and functions being described or shown. A connector 205, such as a metal, plastic or composite connector may be used to connect the left paddle shifter 105 to the rear portion 101 of the steering wheel 100 and/or steering column 200. The connector 205 may include a rod, a hinge, a spring and/or a ball and socket connection to allow the left paddle shifter 105 to be connected to the rear portion 101 of the steering wheel 100 and/or steering column 200. For example, the connector 205 may include a hinge to allow the left paddle shifter 105 to move amongst various locations or positions and a spring to keep a force on the paddle shifter 105 so that when the driver releases the paddle shifter 105, the paddle shifter 105 automatically returns to its idle location or position. The detent mechanism 210 may be made from any suitable material, for example, preferably made of a hard aluminum, titanium or metal material, to prevent or minimize movement or substantial deflection of the detent mechanism 210 when the paddle shifter 105 comes into contact with it.

A system 300 for controlling gear changes in a vehicle is disclosed. The system 300 includes the steering wheel 100 and the detent mechanism 210 having an idle location 215, a first location 220, and a second location 225. Though a first location 220 and a second location 225 are described, it is appreciated that there may be any number of additional locations each with a distinct function. The idle location 215 is an area on the detent mechanism 210 where the paddle shifter 105 is positioned adjacent to or in contact with the detent mechanism 210 when the paddle shifter 105 is in its idle or stationary non-functioning position. The first location 220 is an area on the detent mechanism 210 where the paddle shifter 105 is positioned adjacent to or in contact with the detent mechanism 210 when the paddle shifter 105 has been pulled or pushed by the driver to make a single gear upshift or downshift. The second location 225 is an area on the detent mechanism 210 where the paddle shifter 105 is positioned adjacent to or in contact with the detent mechanism 210 when the paddle shifter 105 has been pulled or pushed by the driver to achieve a secondary function, such as to make an optimal gear upshift or downshift (i.e., to maximize fuel efficiency or to maximize acceleration or performance).

According to various embodiments, there may be a first location 220 and a second location 225 in either or both a pull direction towards the steering wheel of the vehicle or a push direction away from the steering wheel with respect to either or both paddle shifters 105 and 110. For instance, 2 separate and distinct secondary functions may be achieved by either paddle shifter 105 or 110 by either pushing or pulling on either shifter 105 or 110 to a secondary position.

According to exemplary embodiments, the optimal gear upshift or downshift generally includes skipping of one or more gears and/or progressing through one or more gears in sequence in order to maximize fuel efficiency or maximize acceleration or performance. For example, the optimal gear downshift may include maximizing acceleration performance to optimally utilize engine performance. Also, for example, the optimal gear upshift may maximize fuel economy, such as by reducing engine speed at a given vehicle speed. In an exemplary embodiment, engine speed may be reduced as much as possible at each given vehicle speed.

The processor or electronic control unit (ECU) may read a software map or table to determine the appropriate gear or gear shift for the vehicle based on one or more of the following: (1) drive mode (i.e., economy mode, sport mode, normal mode), (2) vehicle speed, and/or (3) current gear. Therefore, a single paddle shifter movement can be used for a single gear shift or multiple gear shifts by pulling or pushing the paddle shifter partially to engage or be at the first position or completely to engage or be at the second position. In one embodiment, moving the paddle shifter 105 from the idle location 215 to the first location 220 requires less force than moving the paddle shifter 105 from the idle location 215 to the second location 225 or the first location 220 to the second location 225.

The system 300 also includes the paddle shifter 105 coupled to the steering wheel 100 and the detent mechanism 210. The paddle shifter 105 may have an idle position with no associated function when the paddle shifter 105 is in the idle location 215, a first operating position with an associated first function when the paddle shifter 105 is in the first location 220, and a second operating position with an associated second function when the paddle shifter 105 is in the second location 225. The associated first function is different from the associated second function. For example, the associated first function can be a gear shift of only 1 gear (either up or down) and the associated second function can be a gear shift of 2 or more gears (either up or down) either by skipping gears or sequentially progressing through 2 or more gears. Hence, according to various embodiments, the associated second function may skip at least one (1) gear. Also, according to various embodiments, the second function can be a shift of one (1) gear while indicating further gear shifts are not possible. For example, a vehicle in second gear cannot change more than one gear lower (to 1st gear). In such a situation, the driver may be notified of the limitation via a display or screen 120.

According to various embodiments, the position of the paddle shifter 105 and 110 upon release of the paddle shifters 105 and 110 may determine whether the first function or the secondary function is performed. In this way, a user may progress through the first position to the second position without enacting the first function.

Figure 4:
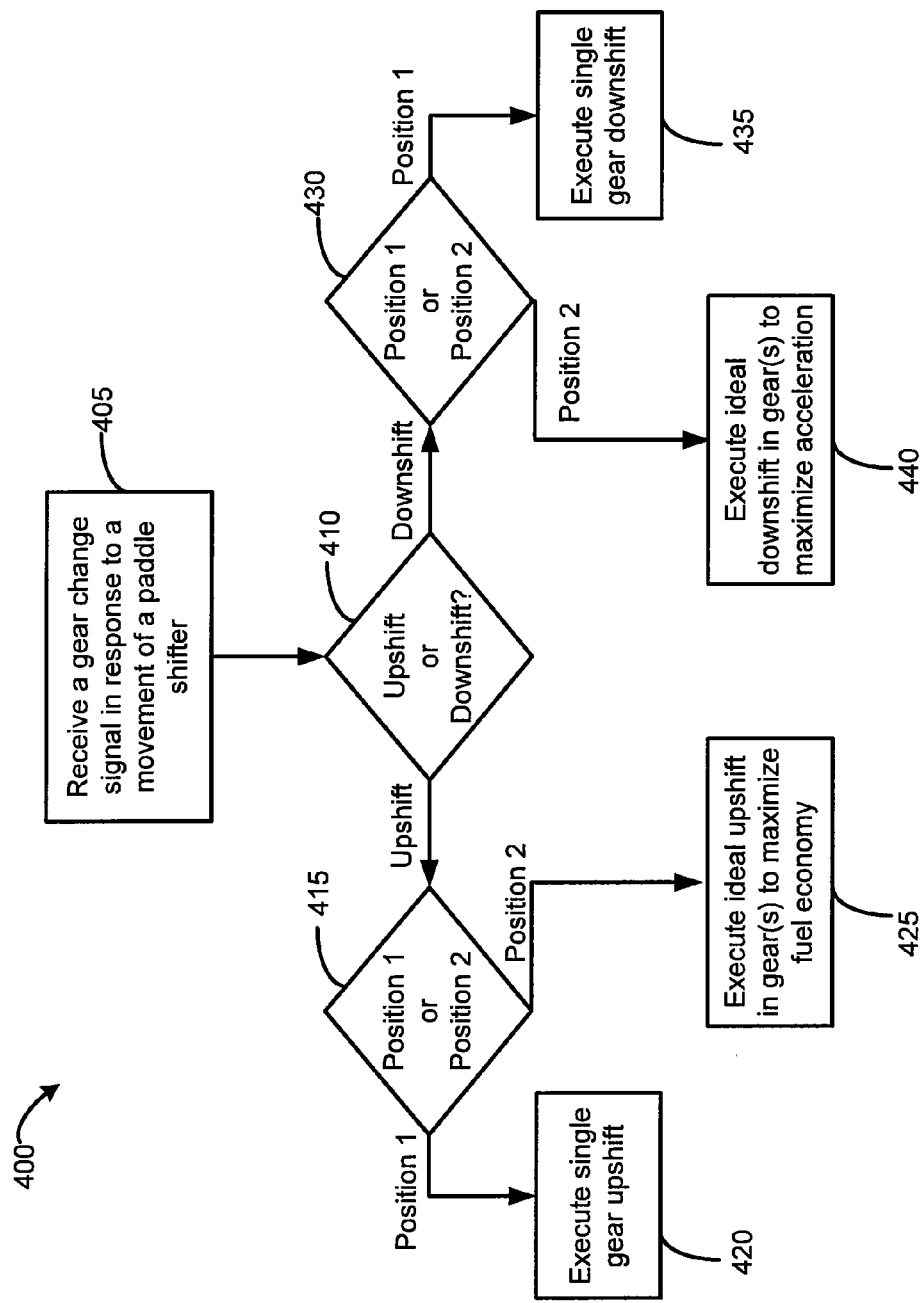
FIG. 4 depicts a flow chart showing a method of optimizing gear changes in a vehicle using paddle shifters according to various embodiments.
Figure 5:
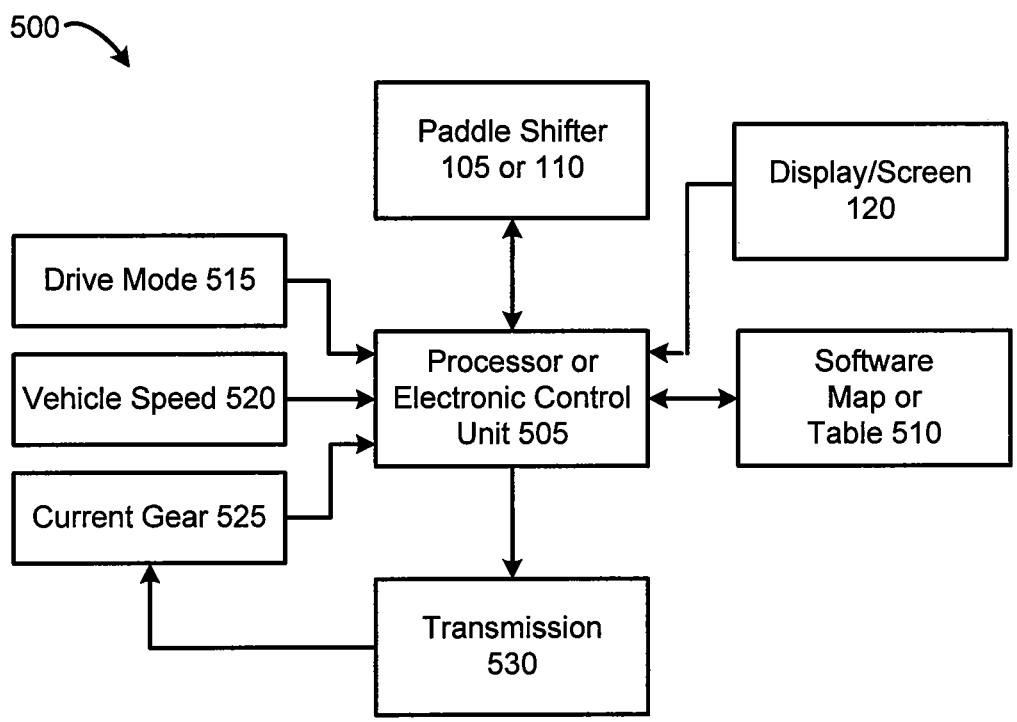
FIG. 5 is an exemplary system for executing the method described in FIG. 4 according to various embodiments.
Figure 6:
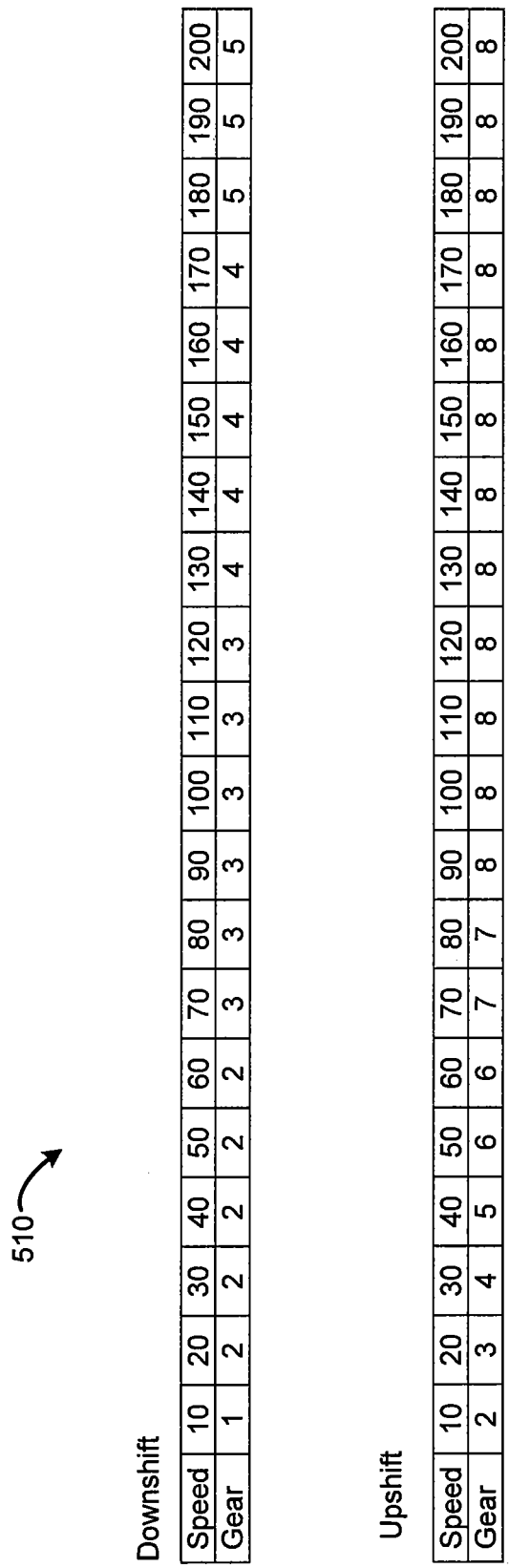
FIG. 6 is an exemplary software map according to various embodiments.

FIG. 4 depicts a flow chart 400 showing a method of optimizing gear changes in a vehicle using paddle shifters according to various embodiments. FIG. 5 is an exemplary system 500 for executing the method described in FIG. 4 according to various embodiments. The system 500 includes the paddle shifters 105 and 110, a processor or electronic control unit (ECU) 505, a software map or table 510, a screen 120, a drive mode 515, a vehicle speed 520, a current gear 525, and a transmission 530. The system 500 may include other vehicle components but have been omitted to avoid unnecessary descriptions. At step 405, the processor 505 receives a gear change signal in response to a movement of a paddle shifter 105 or 110. The processor 505 determines whether the upshift paddle shifter or the downshift paddle shifter was activated based on the gear change signal (step 410). Thereafter, the processor 505 determines whether the paddle shifter was moved to the first position or the second position based on the gear change signal (step 415 or 430). If the paddle shifter was moved to the first position, the processor 505 commands the transmission 530 to execute a single gear upshift (step 420) or a single gear downshift (step 435). If the paddle shifter was moved to the second position, the processor 505 commands the transmission 530 to execute a secondary function, such as an ideal or optimal gear upshift (step 425) to maximize fuel economy or an ideal or optimal gear downshift (step 440) to maximize acceleration or performance. To determine the ideal or optimal gear upshift or downshift, the processor 505 may utilize information such as the drive mode 515, the vehicle speed 520, the current gear 525, a user's custom table of gear changes and/or a software map or table 510 that provides a listing of the optimal gear based on the vehicle speed and/or whether the vehicle is upshifting or downshifting. FIG. 6 is an exemplary software map 600. The secondary function may be activated at any suitable time.

Furthermore, in response to activating the secondary function via paddle shifters 105 and 110, an audio warning and/or visual warning such as an indication on screen 120 may be communicated. In an example, the red light illuminating box may flash in response to the paddle shifters 105 and 110 being moved to the secondary position. In an example, pushing or pulling the paddle shifters 105 and 110 to the secondary position may result in feedback from a haptic response system, such as vibration of the paddle shifters 105 and 110 or the driver's seat to communicate to a user that the paddle shifters 105 and 110 secondary function has been activated.

According to various embodiments, pushing or pulling the paddle shifters 105 and 110 to the secondary position may result in mechanical feedback such as from the detent mechanism or system to communicate to a user that the primary function has been bypassed and/or the secondary function has been activated.

The secondary function has been described as an optimal gear change according to a prescribed table; however, the secondary function can be any suitable secondary function. For instance, the secondary function may be a customizable gear change. For instance, a user and/or vehicle operator may store a personalized gear change map and/or table based on their driver tastes and preferences. This personalized gear change may not be an optimal gear shift but may be a gear shift in accordance with the driver's or operator's desires. This may be a complete table of gears to shift to from the current gear based on a current vehicle speed or a preferred gear to shift to from the current gear.

According to various embodiments, the secondary function may be a customizable gear change based on a driving condition and/or environmental condition. For instance, downshifting with the paddle shifter allows you to increase the engine braking when going down steep or long hills. In advance of a steep decline, a driver may move the paddle shifters to the secondary position to prepare for engine braking. In advance of a steep incline a driver may move the paddle shifters to the secondary position to provide more power when climbing uphill. According to various embodiments, the secondary function may be a customizable gear change such as a series of downshifts before entering a sharp turn and/or a series of upshifts as one exits a sharp turn. According to various embodiments, the secondary function may be preferred gear changes for driving in environmental conditions such as deep snow or on a slippery surface (e.g., a wet road and/or an icy road). According to various embodiments, the secondary function may be a series of gear changes with a set time delay (e.g., between 1 and 5 seconds) between each change. This series could be sequentially up, sequentially down or a gear change up and then a gear change down or vice versa such as when a driver is passing or cornering their vehicle.

Those of ordinary skill will appreciate that the secondary function has been described as being accessed by a mechanical movement of the paddle shifters to a secondary position. It should be appreciated that this secondary function may be achieved by reprogramming, such as via an interface with the ECU, the primary function of the first position. Thus, according to various embodiments, a secondary function may be achieved without moving the paddle shifters to a secondary position, but rather by moving the paddle shifters to the primary position. Moreover, other implementations, mechanical and/or electrical may be used to achieve the secondary function. Such as through use of a switch (not shown).

For example, a switch or button 115 located on the steering wheel 100 (or instrument panel, steering column, steering wheel, paddle shifter 105, 110 or center console) may be used to toggle the functionality of the paddle shifters from a primary function to a secondary function. The switch 115 may be a digital switch that can be actuated using the vehicle's information or entertainment system. In response to the switch being depressed or selected, the paddle shifters 105 and 110 are activated and the display screen 120 with an indicator, such as an illuminated and/or colored indicator to indicate that the paddle shifters 105 and 110 are set to either the primary function or the secondary function.

According to various embodiments, in response to the switch being depressed or selected, the paddle shifters 105 and 110 are activated and the display screen 120 highlights the secondary function is activated such as an illuminated and/or colored indicator (e.g., a green indicator). In response to the switch being depressed or toggled again, the secondary function of the paddle shifters 105 and 110 may be deactivated and the display screen 120 with an indicator, such as an illuminated and/or colored indicator (e.g., a red indicator) may indicate that the paddle shifters 105 and 110 are deactivated.

Those of ordinary skill will appreciate that the various illustrative logical blocks and process steps described in connection with the examples disclosed herein may be implemented as electronic hardware, computer software, or combinations of both. Whether such functionality is implemented as hardware or software depends upon the particular application and design constraints imposed on the overall system. Ordinarily skilled artisans may implement the described functionality in varying ways for each particular application, but such implementation decisions should not be interpreted as causing a departure from the scope of the disclosed apparatus and methods.

Systems, methods and computer program products are provided. References to "various embodiments", in "some embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The storage medium may be integral to the processor. The computational steps disclosed herein may be comprised in an article of manufacture including a non-transitory, tangible computer readable storage medium having instructions stored thereon.

The foregoing description of the disclosed example embodiments is provided to enable any person of ordinary skill in the art to make or use the present invention. Various modifications to these examples will be readily apparent to those of ordinary skill in the art, and the principles disclosed herein may be applied to other examples without departing from the spirit or scope of the present invention. The described embodiments are to be considered in all respects only as illustrative and not restrictive and the scope of the invention is, therefore, indicated by the following claims rather than by the foregoing description. All changes which come within the meaning and range of equivalency of the claims are to be embraced within their scope.

What is claimed is:

1. A system for controlling gear changes in a vehicle, the system comprising:
    a steering wheel; and
    a paddle shifter coupled to the steering wheel and having an idle position with no associated function when the paddle shifter is in the idle position, a first operating position with an associated first function of a single upshift or downshift when the paddle shifter is in the first operating position or released from the first operating position, and a second operating position with an associated second function when the paddle shifter is in the second operating position or released from the second operating position, the associated second function being different from the associated first function, wherein the first operating position is located along a path between the idle position and the second operating position.

2. The system of claim 1, wherein moving the paddle shifter from the idle position to the first operating position requires less force than moving the paddle shifter from the first operating position to the second operating position.

3. The system of claim 1, further comprising an interface configured to transmit a customized operation of the second function.

4. The system of claim 1, wherein the second function is a secondary gear change of an upshift of at least two or a downshift of at least two gears that is determined based on at least one of maximizing fuel efficiency, maximizing acceleration or maximizing performance of the vehicle.

5. The system of claim 4, wherein the secondary gear change is determined based on a software map.

6. The system of claim 5, wherein the software map takes into account at least one of a vehicle drive mode, a vehicle speed, or a current gear.

7. The system of claim 1, wherein the second function is a user selected customized gear change.

8. The system of claim 1, wherein the second function is a customizable gear change based on at least one of a driving condition or an environmental condition.

9. The system of claim 1, wherein mechanical feedback is transmitted in response to the paddle shifter being moved to at least one of the first operating position or the second operating position.

10. A vehicle having a transmission capable of shifting up or down by multiple gears, the vehicle comprising:
    a transmission having multiple gears;
    a steering wheel;
    a paddle shifter coupled to the steering wheel and having an idle position, a first operating position and a second operating position, the first operating position being located along a path between the idle position and the second operating position, the paddle shifter being configured to generate a first signal in response to being in the first operating position or released from the first operating position and a second signal in response to being in the second operating position or released from the second operating position; and
    an electronic control unit coupled to the paddle shifter and the transmission and configured to cause the transmission to shift up one gear or shift down one gear in response to receiving the first signal and to cause the transmission to perform a second function in response to receiving the second signal.

11. The vehicle of claim 10, wherein moving the paddle shifter from the idle position to the first operating position requires less force than moving the paddle shifter from the first operating position to the second operating position.

12. The vehicle of claim 10, further comprising an interface configured to transmit a customized operation of the second function.

13. The vehicle of claim 10, wherein the second function is a secondary gear change of the transmission of at least two gears up or two gears down, the secondary gear change being determined based on at least one of maximizing fuel efficiency, maximizing acceleration or maximizing performance of the vehicle.

14. The vehicle of claim 13, wherein the secondary gear change is determined based on a software map.

15. The vehicle of claim 14, wherein the software map is based on at least one of a vehicle drive mode, a vehicle speed, or a current gear.

16. The vehicle of claim 10, wherein the second function is a user selected customized gear change.

17. The vehicle of claim 10, wherein the second function is a. customizable gear change based on at least one of a driving condition or an environmental condition.

* * * * *